United States Patent
Miyajima

(10) Patent No.: US 10,908,544 B2
(45) Date of Patent: Feb. 2, 2021

(54) DISCRIMINATING DEVICE AND IMAGE FORMING APPARATUS

(71) Applicant: CANON KABUSHIKI KAISHA, Tokyo (JP)

(72) Inventor: Yu Miyajima, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/890,298

(22) Filed: Jun. 2, 2020

(65) Prior Publication Data
US 2020/0387079 A1 Dec. 10, 2020

(30) Foreign Application Priority Data
Jun. 5, 2019 (JP) ................. 2019-105355

(51) Int. Cl.
G03G 15/00 (2006.01)
G01N 21/00 (2006.01)
G01N 21/47 (2006.01)
G01N 21/86 (2006.01)

(52) U.S. Cl.
CPC ......... *G03G 15/5029* (2013.01); *G01N 21/47* (2013.01); *G01N 21/86* (2013.01); *G01N 2021/8663* (2013.01); *G01N 2201/08* (2013.01); *G03G 2215/00616* (2013.01)

(58) Field of Classification Search
CPC ..... G03G 15/5029; G03G 2215/00611; G03G 2215/00616; G03G 2215/0062; G01N 21/47; G01N 21/55; G01N 21/59; G01N 21/86; G01N 2201/062; G01N 2201/0636;
(Continued)

(56) References Cited

U.S. PATENT DOCUMENTS

| 8,493,637 B2 * | 7/2013 | Takeda ................. G02B 17/086 358/474 |
| 10,012,938 B2 | 7/2018 | Miyajima |
| 10,054,790 B2 | 8/2018 | Sumida et al. |

(Continued)

FOREIGN PATENT DOCUMENTS

| JP | 57192975 A | * 11/1982 | .......... G03G 15/041 |
| JP | 2008026226 A | 2/2008 | |
| JP | 2013029650 A | * 2/2013 | |

*Primary Examiner* — Robert B Beatty
(74) *Attorney, Agent, or Firm* — Carter, DeLuca & Farrell LLP

(57) ABSTRACT

Provided is a discriminating device including a light-receiving unit receiving light beam from a detected surface (DS) and an optical unit (OU) guiding light beam from DS to light-receiving unit, and satisfying following conditional expressions:

$$0.01 \le |\beta m1/\beta m0 - 1|, \text{ and}$$

$$1 < |\beta m1/\beta m0 - 1|/|\beta s1/\beta s0 - 1|,$$

where $\beta m0$ represents a magnification of OU with respect to a first direction in a first cross section parallel to DS when DS is at a first position, $\beta m1$ represents a magnification of OU with respect to first direction in first cross section when DS is at a second position shifted from first position by +0.2 mm in a direction perpendicular to DS, $\beta s0$ represents a magnification of OU with respect to a second direction perpendicular to first direction in first cross section when DS is at first position, and $\beta s1$ represents a magnification of OU with respect to second direction in first cross section when DS is at second position.

15 Claims, 5 Drawing Sheets

(58) Field of Classification Search
CPC ....... G01N 2201/0638; G01N 2201/08; G01N 2021/8663; G01N 2021/8609
USPC .................................................. 399/45, 389
See application file for complete search history.

(56) References Cited

U.S. PATENT DOCUMENTS

| | | |
|---|---|---|
| 10,401,770 B2 | 9/2019 | Miyajima |
| 10,670,984 B2 | 6/2020 | Miyajima |
| 2011/0150508 A1* | 6/2011 | Miyajima .............. G03G 15/01 399/40 |
| 2015/0211992 A1* | 7/2015 | Ishizumi ............ G03G 15/5058 399/49 |
| 2016/0202393 A1 | 7/2016 | Saiga et al. |
| 2016/0252451 A1* | 9/2016 | Kawate ................ G01N 21/474 359/858 |
| 2017/0131669 A1* | 5/2017 | Miyajima ............ G03G 15/043 |
| 2017/0131670 A1* | 5/2017 | Ino ..................... G03G 15/5054 |
| 2018/0329348 A1* | 11/2018 | Miyajima ............. G02B 17/00 |
| 2019/0163083 A1* | 5/2019 | Miyajima ............. G01J 3/0256 |
| 2020/0057299 A1 | 2/2020 | Teramura et al. |
| 2020/0057402 A1 | 2/2020 | Teramura et al. |

\* cited by examiner

DISCRIMINATING DEVICE AND IMAGE FORMING APPARATUS

BACKGROUND OF THE INVENTION

Field of the Invention

The present invention relates to a discriminating device, and more particularly, to a discriminating device suitable as a device configured to discriminate the type of a recording material, which is mounted on an image forming apparatus such as a laser beam printer (LBP), a digital copying machine, and a multi-function printer (MFP).

Description of the Related Art

In recent years, in an image forming apparatus, in order to determine image forming conditions in accordance with the type of a recording material, there has been mounted a discriminating device configured to discriminate the type of a recording material.

As a discriminating device of this kind, there may be utilized a surface detection device configured to observe the light-dark contrast of a surface of a recording material by illuminating the recording material.

In Japanese Patent Application Laid-Open No. 2008-26226, there is disclosed a surface detection device in which an imaging optical system for imaging a detected object is a telecentric optical system.

The surface detection device disclosed in Japanese Patent Application Laid-Open No. 2008-26226 can retain detection accuracy because magnification does not vary even when a detected object shifts in an optical axis direction, but a detection region is narrower compared to a non-telecentric optical system.

SUMMARY OF THE INVENTION

In view of the foregoing, it is an object of the present invention to provide a discriminating device capable of achieving both securing of a detection region and retaining of detection accuracy.

According to the present invention, there is provided a discriminating device including a light receiving unit configured to receive a light beam from a detected surface, and an optical unit configured to guide the light beam from the detected surface to the light receiving unit. The discriminating device satisfies the following conditional expressions:

$$0.01 \leq |\beta m1/\beta m0 - 1|, \text{ and}$$

$$1 < |\beta m1/\beta m0 - 1|/|\beta s1/\beta s0 - 1|,$$

where $\beta m0$ represents a magnification of the optical unit with respect to a first direction in a first cross section parallel to the detected surface when the detected surface is at a first position, $\beta m1$ represents a magnification of the optical unit with respect to the first direction in the first cross section when the detected surface is at a second position, the second position being shifted from the first position by +0.2 mm in a direction perpendicular to the detected surface, $\beta s0$ represents a magnification of the optical unit with respect to a second direction perpendicular to the first direction in the first cross section when the detected surface is at the first position, and $\beta s1$ represents a magnification of the optical unit with respect to the second direction in the first cross section when the detected surface is at the second position.

Further features of the present invention will become apparent from the following description of exemplary embodiments with reference to the attached drawings.

DESCRIPTION OF THE EMBODIMENTS

A preferred embodiment of the present invention will now be described in detail in accordance with the accompanying drawings. Now, a discriminating device according to an embodiment of the present invention is described with reference to the drawings. The drawings to be referred to below may not be drawn to scale in order to facilitate understanding of the embodiments.

Figure 1A:
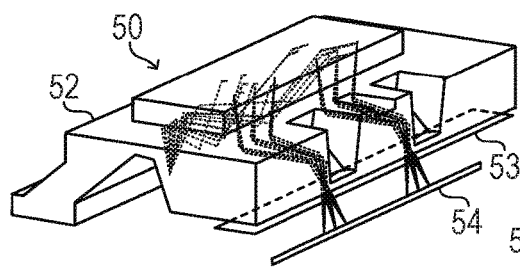
FIG. 1A is a perspective view of main units of a discriminating device according to at least one embodiment of the present invention.
Figure 1B:
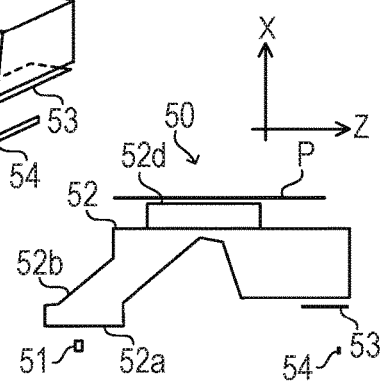
FIG. 1B is a side view of the main units of the discriminating device according to the at least one embodiment.
Figure 1C:
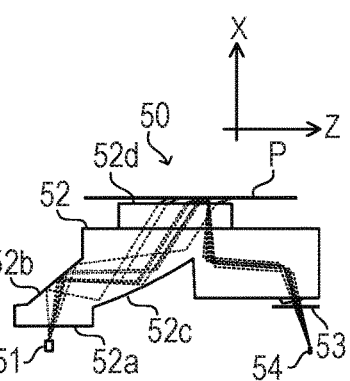
FIG. 1C is a sectional view of the main units of the discriminating device according to the at least one embodiment.
Figure 1D:
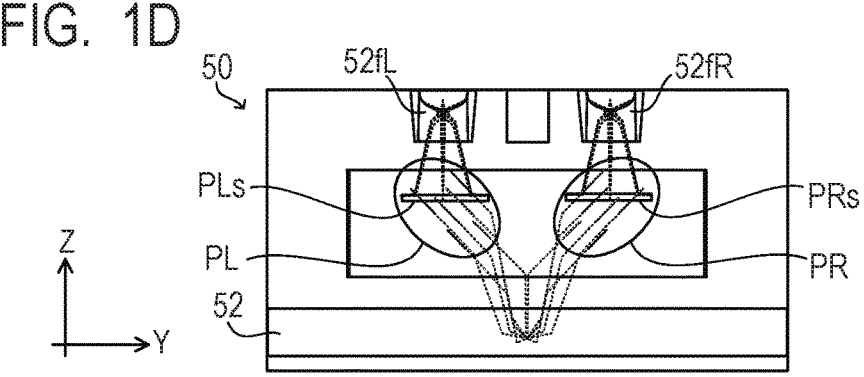
FIG. 1D is a top view of the main units of the discriminating device according to the at least one embodiment.
Figure 1E:
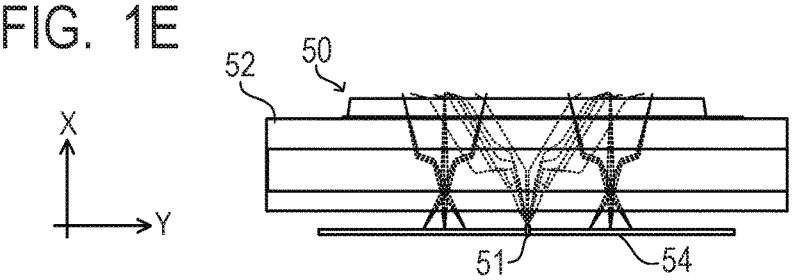
FIG. 1E is a rear view of the main units of the discriminating device according to the at least one embodiment.
Figure 1F:
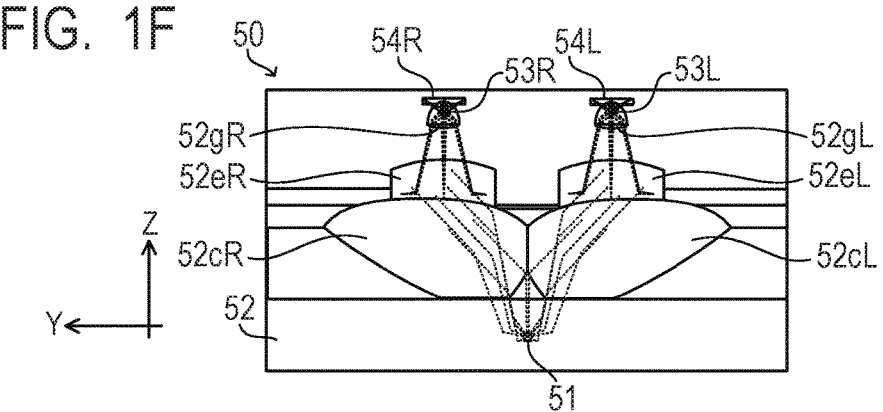
FIG. 1F is a bottom view of the main units of the discriminating device according to the at least one embodiment.

FIG. 1A to FIG. 1F are a perspective view, a side view, a sectional view, a top view, a rear view, and a bottom view, respectively, of main units of a discriminating device 50 according to at least one embodiment of the present invention. Dotted lines and solid lines in the drawings represent some light beams traveling inside and outside a light guiding member 52. For easy understanding of the light guiding member 52, only opening portions out of components of a stop 53 are illustrated in FIG. 1F, and only a first imaging region and a second imaging region, which are described later, out of components of a light receiving element 54 are illustrated in FIG. 1F.

The discriminating device 50 according to the at least one embodiment includes a light source 51 (light source unit), the light guiding member 52, a stop 53, and a light receiving element 54 (light receiving unit).

The light source 51 is an infrared LED (a wavelength of 870 nm) including a single light emitting portion of 0.30 mm×0.30 mm, which is generally called a top view type light source, and is configured to emit light beams in a radial manner from its light emitting surface, with a surface normal direction to the light emitting surface being an optical axis.

The light source 51 being the infrared LED has light distribution intensity characteristics (Lambert distribution) in which the light amount in the surface normal direction to the light emitting surface is the maximum, and the light amount gradually decreases as the tilt of the light beams from the surface normal increases.

The light guiding member 52 is an optical element formed of an acrylic resin (PMMA).

The light guiding member 52 includes a left-side illumination unit 52xL and a right-side illumination unit 52xR (illumination light guiding units), and a left-side optical unit 52yL and a right-side optical unit 52yR (imaging light guiding units), which correspond to the left-side illumination unit 52xL and the right-side illumination unit 52xR, respectively.

As illustrated in FIG. 1C and FIG. 1F, the light guiding member 52 has an illumination incident flat surface 52a, an illumination reflecting flat surface 52b, a left-side illumination reflecting curved surface 52cL (first curved reflection surface) having a concave shape, a right-side illumination reflecting curved surface 52cR (second curved reflection surface) having a concave shape, and an illumination exit flat surface 52d.

Accordingly, the left-side illumination unit 52xL and the right-side illumination unit 52xR have the left-side illumination reflecting curved surface 52cL and the right-side illumination reflecting curved surface 52cR, respectively. The illumination incident flat surface 52a, the illumination reflecting flat surface 52b, and the illumination exit flat surface 52d are shared by the left-side illumination unit 52xL and the right-side illumination unit 52xR.

In the discriminating device 50 according to the at least one embodiment, the left-side illumination reflecting curved surface 52cL and the right-side illumination reflecting curved surface 52cR protrude from the peripheral outer shape of the light guiding member 52.

With such a configuration of the outer shape, the left-side illumination reflecting curved surface 52cL and the right-side illumination reflecting curved surface 52cR also play the role of stops for illumination light beams. In other words, the left-side illumination reflecting curved surface 52cL and the right-side illumination reflecting curved surface 52cR are optical surfaces configured to regulate light beams.

As illustrated in FIG. 1C, FIG. 1D, and FIG. 1F, the light guiding member 52 has a left-side first imaging reflecting curved surface 52eL, a left-side second imaging reflecting curved surface 52fL, and a left-side imaging transmitting curved surface (transmission surface) 52gL. The light guiding member 52 further has a right-side first imaging reflecting curved surface 52eR, a right-side second imaging reflecting curved surface 52fR, and a right-side imaging transmitting curved surface 52gR.

Accordingly, the left-side optical unit 52yL has the left-side first imaging reflecting curved surface 52eL, the left-side second imaging reflecting curved surface 52fL, and the left-side imaging transmitting curved surface 52gL. The right-side optical unit 52yR has the right-side first imaging reflecting curved surface 52eR, the right-side second imaging reflecting curved surface 52fR, and the right-side imaging transmitting curved surface 52gR. An imaging incident flat surface 52d is shared by the left-side optical unit 52yL and the right-side optical unit 52yR.

The stop 53 for restricting a light flux has a left-side opening 53L and a right-side opening 53R. The openings each have a size of □0.3 mm×0.4 mm, and is narrower in the left-right direction (Y direction). The thickness of the stop 53 is 0.1 mm.

The light receiving element (image pickup element) 54 has a configuration in which photoelectric conversion elements such as a plurality of Si photodiodes are arranged in an array in a direction (Y direction, first direction) perpendicular to a conveyance direction (Z direction, second direction) of a recording material P within a cross section (first cross section) parallel to the recording material P (detected surface).

The light receiving element 54 has a size of one pixel of 21.15 μm×42.3 μm in order to be adaptable to a resolution of 1,200 dpi.

In the discriminating device 50 according to the at least one embodiment, the light guiding member 52 is held on a housing (not shown).

The light source 51 and the light receiving element 54 are mounted on the same electrical board (not shown), and the electrical board is fixed to the housing with screws.

Further, the housing (not shown) and the light guiding member 52 are held in abutment against each other in an end portion of the light guiding member 52 so that dust, paper powder, and the like do not enter the housing through a gap.

Next, a method of discriminating the type of a recording material (object) through use of the discriminating device 50 according to the at least one embodiment is described.

As described below, the discriminating device 50 according to the at least one embodiment illuminates the recording material P (illustrated only in FIG. 1B and FIG. 1C for easier understanding) conveyed in the Z direction in the drawings with light beams exiting from the discriminating device 50. The illuminated recording material P scatters light beams, and the scattered light beams are received by the discriminating device 50 to be used for the photographing of a surface image of the recording material P.

Output from the light receiving element 54 is one-dimensional data, but two-dimensional data is obtained because the recording material P is conveyed.

The photographed surface image has shades caused by the surface unevenness of the recording material P, and the type of the recording material P can be discriminated by estimating the alignment, height, width, and the like of fibers from the shades.

As illustrated in FIG. 1C, a plurality of light beams emitted from the light source 51 pass through the illumination incident flat surface 52a of the light guiding member 52 and are reflected from the illumination reflecting flat surface 52b, to thereby enter the left-side illumination reflecting curved surface 52cL and right-side illumination reflecting curved surface 52cR.

Then, a plurality of first light beams and a plurality of second light beams having entered the left-side illumination reflecting curved surface 52cL and the right-side illumination reflecting curved surface 52cR are reflected, respectively, and at least some of the reflected light beams of each of them become substantially parallel to each other at least within the cross section parallel to the recording material P.

Then, the plurality of light beams that have become substantially parallel to each other are emitted from the illumination exit flat surface 52d to be radiated to the recording material P present on the detected surface.

Specifically, a first light flux, which is formed of the plurality of first light beams having traveled through the left-side illumination unit 52xL, and a second light flux, which is formed of the plurality of second light beams having traveled through the right-side illumination unit 52xR, illuminate a first illuminated region PL (first effective illuminated region) and a second illuminated region PR (second effective illuminated region), respectively, which are different regions of the same recording material P.

In the discriminating device 50 according to the at least one embodiment, shading caused by unevenness of a surface of the recording material P is emphasized to improve accuracy of discrimination of the type of a recording material by setting an angle between an incident direction of the light beams with respect to the recording material P and the surface normal to the recording material P to a shallow angle of about 70°.

Discrimination is possible when the incident angle of illumination light beams is 60° or more. An incident angle of 70° or more leads to clear shades and accordingly high accuracy of discrimination.

If the illumination light beams have a certain spread (that is, the plurality of illumination light beams are not substantially parallel to one another), the direction of shading caused on the recording material P varies from one illuminated point to another. This means that a different recording material type is identified at each pixel of the light receiving element 54, resulting in a drop in the accuracy of recording material discrimination.

In order to reduce the drop in the accuracy of recording material discrimination, the discriminating device 50 according to the at least one embodiment is designed so that some of the plurality of light beams incident on the recording material P are substantially parallel to one another in at least a cross section parallel to the recording material P.

In general, printing paper is used as the recording material P, and printing paper is cut in a direction substantially parallel to or substantially perpendicular to the fiber orientation direction.

It is therefore required to consider a case in which the fiber orientation direction is parallel or perpendicular to the conveyance direction.

In the discriminating device 50 according to the at least one embodiment, the recording material P is illuminated so that an angle formed by the incident light beams with respect to the conveyance direction (Z direction) of the recording material P is close to ±45° in the cross section parallel to the recording material P.

More specifically, in the discriminating device 50 according to the at least one embodiment, an average angle of the plurality of first light beams incident on the first illuminated region PL differs from an average angle of the plurality of second light beams incident on the second illuminated region PR by 80° to 110° in the cross section parallel to the recording material P.

The difference between the illumination angles enables the discriminating device 50 to obtain differently shaded images (different pieces of information) of the same recording material P.

With the use of the both pieces of information, the type of the recording material P can stably be discriminated irrespective of whether the fiber orientation direction is parallel or perpendicular to the conveyance direction.

Some of scattered light beams scattered from a first intake region PLs out of the first illuminated region PL of the recording material P placed on the detected surface pass through the imaging incident flat surface 52d of the light guiding member 52, are reflected by the left-side first imaging reflecting curved surface 52eL and the left-side second imaging reflecting curved surface 52fL in the stated order, and are then transmitted through the left-side imaging transmitting curved surface 52gL.

The light beams transmitted through the left-side imaging transmitting curved surface 52gL pass through the left-side opening 53L of the stop 53, and are guided to a first imaged region 54L (first effective light receiving region) on a light receiving surface (image pickup surface) of the light receiving element 54.

Similarly, some of scattered light beams scattered from a second intake region PRs out of the second illuminated region PR pass through the imaging incident flat surface 52d of the light guiding member 52, are reflected by the right-side first imaging reflecting curved surface 52eR and the right-side second imaging reflecting curved surface 52fR in the stated order, and are then transmitted through the right-side imaging transmitting curved surface 52gR.

The light beams transmitted through the right-side imaging transmitting curved surface 52gR pass through the right-side opening 53R of the stop 53, and are guided to a second imaged region 54R (second effective light receiving region) on the light receiving surface (image pickup surface) of the light receiving element 54.

The first imaged region 54L and the second imaged region 54R are different regions on the same light receiving element 54.

The first imaged region 54L and the second imaged region 54R on the light receiving element 54 are configured so as to be conjugate with the first intake region PLs and the second intake region PRs, respectively, on the recording material P by the left-side optical unit 52yL and the right-side optical unit 52yR.

In the discriminating device 50 according to the at least one embodiment, the left-side illumination unit 52xL and the right-side illumination unit 52xR are both used to illuminate the first illuminated region PL and the second illuminated region PR, which are regions of the recording material P on the detected surface and are spaced apart from each other, from two directions different from each other.

Some of scattered light beams scattered from the first intake region PLs and some of scattered light beams scattered from the second intake region PRs are received in the first imaged region 54L and second imaged region 54R of the light receiving element 54 via the left-side optical unit 52yL and the right-side optical unit 52yR, respectively, to thereby obtain two surface images of the recording material P.

The two surface images have information about the first region of the recording material P and information about the second region of the recording material P, which correspond to the first intake region PLs and the second intake region PRs, respectively, and which differ from each other, and the use of the two surface images having the information improves the accuracy of discriminating the type of the recording material P.

In addition, the discrimination of the recording material P is performed at high speed by obtaining the surface images at the same time, which enables the discriminating device 50 to function in an image forming apparatus having a high conveyance speed.

A discriminating unit (not shown) then discriminates the type of the recording material P based on output from the light receiving element 54.

The discriminating device 50 according to the at least one embodiment is an imaging system having a magnification of −0.5 in a pixel alignment direction of the light receiving element 54 and a magnification of −1.0 (equal magnification) in a direction perpendicular to the pixel alignment direction. A range of the recording material P on the detected surface that is read by one pixel of the light receiving element 54 is accordingly 42.3 μm×42.3 μm.

Next, in Table 1, there are shown specification values of the discriminating device 50 according to the at least one embodiment.

TABLE 1

|  | Symbol | value |
| --- | --- | --- |
| Light source 51 (LED) main wavelength | λ | 780 nm |
| Light guiding member 52 refractive index | n(λ) | 1.53318 |

| Aspherical surface coefficients | 52cL 52cR | 52eL 52eR | 52fL 52fR | 52gL 52gR |
| --- | --- | --- | --- | --- |
| R | 3.06 | | | |
| K | −1 | | | |
| C1, 0 | | −1.111E+00 | 1.021E−01 | 2.523E−01 |
| C0, 1 | | — | — | — |
| C2, 0 | | −1.390E−01 | 2.395E−02 | −3.189E−01 |
| C1, 1 | | — | — | — |
| C0, 2 | | — | 7.329E−02 | −4.890E−01 |
| C3, 0 | | −2.485E−02 | −5.156E−03 | −1.586E−01 |
| C2, 1 | | — | — | — |
| C1, 2 | | 2.352E−02 | −2.728E−02 | −8.826E−02 |
| C0, 3 | | — | — | — |
| C4, 0 | | −8.706E−03 | −9.293E−04 | 1.487E−01 |
| C3, 1 | | — | — | — |
| C2, 2 | | −8.293E−03 | −1.760E−02 | 1.650E−01 |
| C1, 3 | | — | — | — |
| C0, 4 | | — | −6.357E−02 | 1.119E−01 |
| C5, 0 | | — | — | 8.069E−02 |
| C4, 1 | | — | — | — |
| C3, 2 | | −1.500E−02 | 4.235E−03 | — |
| C2, 3 | | — | — | — |
| C1, 4 | | −3.646E−03 | 4.709E−02 | 5.001E−01 |
| C0, 5 | | — | — | — |
| C6, 0 | | — | — | 2.354E−01 |
| C5, 1 | | — | — | — |
| C4, 2 | | — | 1.835E−03 | — |
| C3, 3 | | — | — | — |
| C2, 4 | | 4.891E−03 | −2.822E−02 | — |
| C1, 5 | | — | — | — |
| C0, 6 | | — | 4.011E−02 | −2.488E−01 |
| C7, 0 | | — | — | 1.420E+00 |
| C6, 1 | | — | — | — |
| C5, 2 | | — | — | — |
| C4, 3 | | — | — | — |
| C3, 4 | | — | — | — |
| C2, 5 | | — | — | — |
| C1, 6 | | — | — | — |
| C0, 7 | | — | — | — |
| C8, 0 | | — | — | −1.824E+00 |
| C7, 1 | | — | — | — |
| C6, 2 | | — | — | — |
| C5, 3 | | — | — | — |
| C4, 4 | | — | — | — |
| C3, 5 | | — | — | — |
| C2, 6 | | — | — | — |
| C1, 7 | | — | — | — |
| C0, 8 | | — | −7.467E−02 | — |
| C9, 0 | | — | — | −6.311E+00 |
| C8, 1 | | — | — | — |
| C7, 2 | | — | — | — |
| C6, 3 | | — | — | — |
| C5, 4 | | — | — | — |
| C4, 5 | | — | — | — |
| C3, 6 | | — | — | — |
| C2, 7 | | — | — | — |
| C1, 8 | | — | — | — |
| C0, 9 | | — | — | — |

TABLE 1-continued

| | Coordinate | | | Tilt (surface normal direction) | | |
| --- | --- | --- | --- | --- | --- | --- |
| | X | Y | Z | TiltX | TiltY | TiltZ |
| Light source 51 | 0 | 0 | 0 | 0 | 0 | 0 |
| Illumination incident flat surface 52a | 0.63 | 0 | 0 | 0 | 180 | 0 |
| Illumination reflecting flat surface 52b | 2.38 | 0 | 0 | 0 | −140 | 0 |
| Illumination reflecting curved surface 52cL (surface vertex) | 1.751 | 1.038 | −3.515 | −45 | −43 | 0 |
| Illumination reflecting curved surface 52cR (surface vertex) | 1.751 | −1.038 | −3.515 | 45 | −43 | 0 |
| Illumination exit flat surface 52d | 6.08 | 0 | 0 | 0 | 180 | 0 |
| Detected surface | 6.28 | 0 | 0 | 0 | 180 | 0 |
| First imaging reflecting curved surface 52eL | 3.44 | −4 | 7 | 0 | 180 | 0 |
| Second imaging reflecting curved surface 52fL | 3.21 | −4 | 10.35 | 0 | 135 | 0 |
| Imaging transmitting curved surface 52gL | 1.78 | −4 | 10.85 | 0 | 180 | 0 |
| Opening 53L (Incident side surface) | 1.58 | −4 | 10.9 | 0 | 180 | 0 |
| First imaging reflecting curved surface 52eR | 3.44 | 4 | 7 | 0 | 180 | 0 |
| Second imaging reflecting curved surface 52fR | 3.21 | 4 | 10.35 | 0 | 135 | 0 |
| Imaging transmitting curved surface 52gR | 1.78 | 4 | 10.85 | 0 | 0 | 0 |
| Opening 53R (Incident side surface) | 1.58 | 4 | 10.9 | 0 | 0 | 0 |
| Light receiving element 54 (Light receiving surface) | −0.22 | 0 | 11.5 | 0 | 0 | 0 |

In this case, an origin of a coordinate system is the center of the light emitting surface of the light source 51, and the conveyance direction of the recording material P, a direction perpendicular to the recording material P, that is, a normal direction to the detected surface, and a direction that is parallel to the recording material P and perpendicular to the conveyance direction thereof are defined as a Z direction (second direction), an X direction, and a Y direction (first direction), respectively.

Shapes of the left-side illumination reflecting curved surface 52cL and the right-side illumination reflecting curved surface 52cR are defined by a local polar coordinate system ($L_r$, $L_z$) in which a surface vertex is an origin, a radial direction is an $L_r$ direction, and the surface normal direction is an $L_z$ direction, and are represented by the following Expression (1). Symbols R and "k" represent aspherical surface coefficients.

$$L_z = \frac{\frac{L_r^2}{R}}{1 + \sqrt{1-(1+k)\frac{L_r^2}{R^2}}} \quad (1)$$

The shapes of the left-side first imaging reflecting curved surface 52eL, the right-side first imaging reflecting curved surface 52eR, the left-side second imaging reflecting curved surface 52fL, the right-side second imaging reflecting curved surface 52fR, the left-side imaging transmitting curved surface 52gL, and the right-side imaging transmitting curved surface 52gR are defined by a local coordinate system ($L_x$, $L_y$, $L_z$), which is a right-handed coordinate system having a surface vertex as its origin, and are represented by the following Expression (2). The $L_y$ axis is parallel to the Y axis and runs in the same direction as that of the Y axis.

$$L_z = \sum_{m,n} C_{m,n} L_x^m L_y^n \quad (2)$$

As is understood from Table 1, the shape of the light guiding member 52 is symmetrical with respect to a plane that satisfies Y=0.

In Table 1, TiltX, TiltY, and TiltZ indicate the direction of a surface normal ($L_z$) (indicate a +X axis when TiltX=TiltY=TiltZ=0), and represent clockwise rotation angles about the +X axis, a +Y axis, and a +Z axis, respectively.

An object to be solved by the embodiment is described next.

Figure 2A:
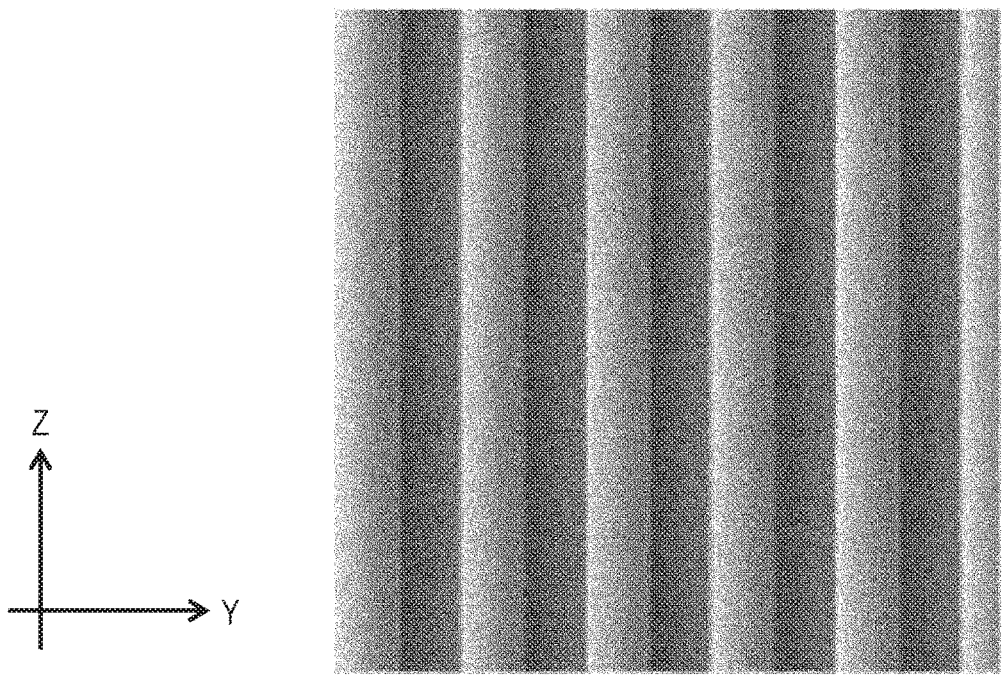
FIG. 2A is a diagram for illustrating a model of shade distribution on a surface of a recording material.

First, the distribution (□0.32 mm) illustrated in FIG. 2A, in which changes follow a pattern represented by a sin function, is considered as a shade distribution on a surface of the recording material P (an illuminance distribution observed on a surface of the recording material P before the distribution is obtained as images by the optical units).

The shade distribution set here has a 60-μm cycle, which is an example of a 50-μm cycle to 400-μm cycle of fiber alignment caused in general printing paper due to how printing paper is manufactured.

A case in which the conveyance direction of the recording material P and the fiber alignment direction are substantially parallel to each other is now considered.

In this case, surface properties of the recording material P are evaluated by mainly using a shade distribution in the Y direction, which is the pixel alignment direction of the light receiving element 54.

Figure 2B:
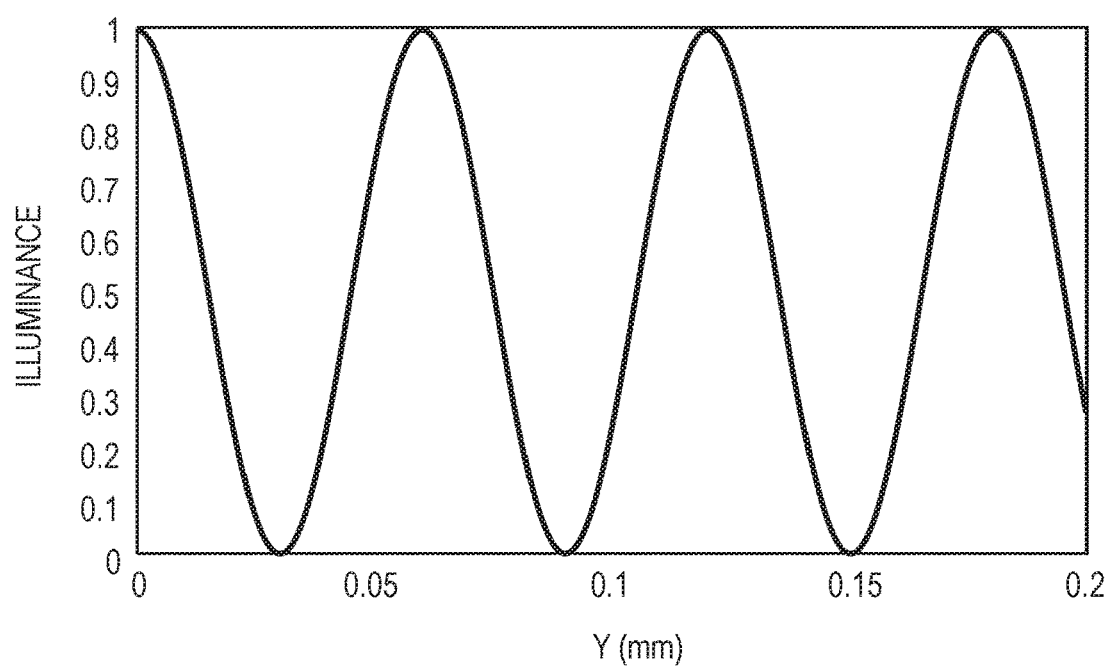
FIG. 2B is a graph for showing a model of shade distribution on the surface of the recording material.

The distribution in this case is illustrated in FIG. 2B, in which peak values of the illuminance are normalized.

Fibers of actual printing paper do not have a complete cycle structure, and the shade distribution in actual printing paper therefore does not have as clear a cycle as the ones illustrated in FIG. 2A and FIG. 2B. However, the model described above suffices for a description of the basic principle of the discriminating device 50 according to the at least one embodiment.

In the discriminating device 50 according to the at least one embodiment, a surface image is obtained by reading a range of 42.3 μm×42.3 μm per pixel in the shade distribution described above.

This reading range is not quite small compared to the fiber alignment cycle described above. The resultant dull view of the shade distribution leads to seeming low contrast when the shade distribution is obtained as an image distribution (a distribution observed when the illuminance distribution on a surface of the recording material P is obtained as images by the optical units).

In addition, the recording material P has a placement error of approximately ±0.2 mm in a defocus direction (the X direction). The value "±0.2 mm" given here is the value of an error that may be caused by, for example, variations in conveyance situations of the recording material P, or the wearing of the imaging incident flat surface 52d accompanying overlong conveyance of the recording material P.

This displacement of the recording material P in the defocus direction increases variations in imaging magnification in a small-sized optical system as used in the discriminating device 50 according to the at least one embodiment.

Figure 3:
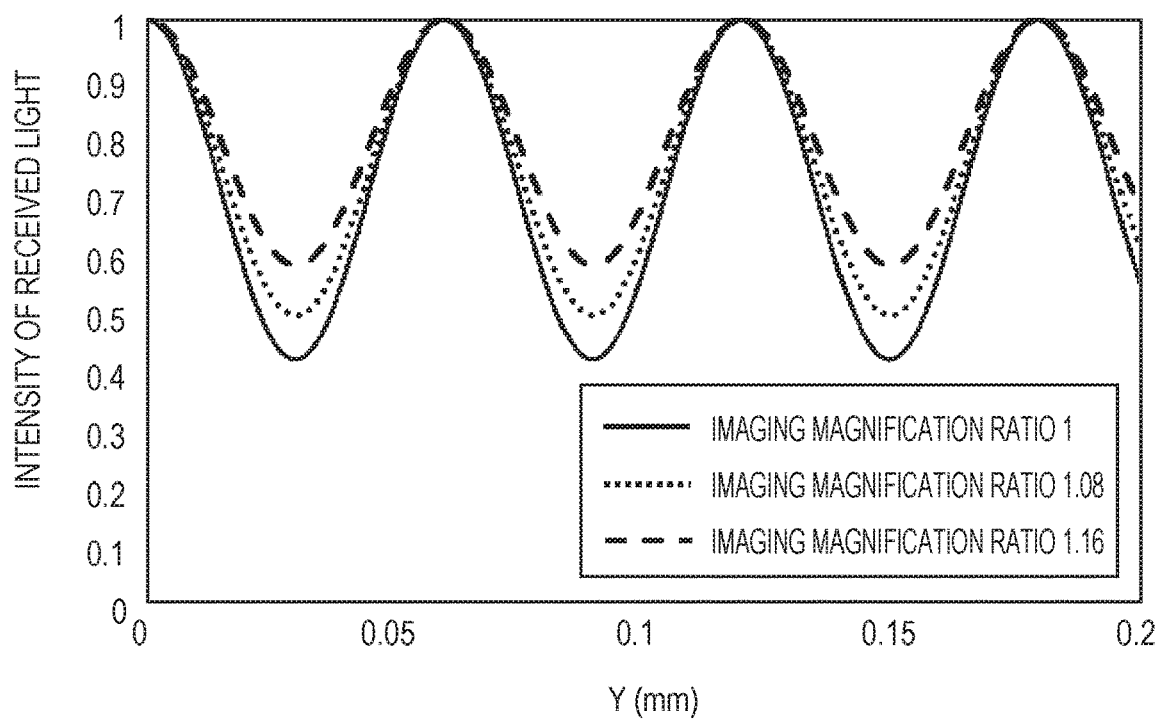
FIG. 3 is a graph for showing a change in image distribution with a change in imaging magnification ratio in the discriminating device.

FIG. 3 is a graph for showing image distributions observed when a nominal imaging magnification changes by 8% (a range of 45.7 μm×42.3 μm is read per pixel) and by 16% (a range of 49.1 μm×42.3 μm is read per pixel) in the discriminating device 50.

The nominal imaging magnification is an imaging magnification of the discriminating device 50 for imaging of the detected surface at a nominal position, which is a position conjugate with the light receiving element 54. An imaging magnification ratio is the ratio of a changed imaging magnification to the nominal imaging magnification.

The image distributions shown in FIG. 3 are obtained by performing the calculation of a moving average on the per-pixel reading ranges described above in the shade distribution illustrated in FIG. 2B. In the image distributions, peak values of the intensity of received light are normalized.

Figure 4:
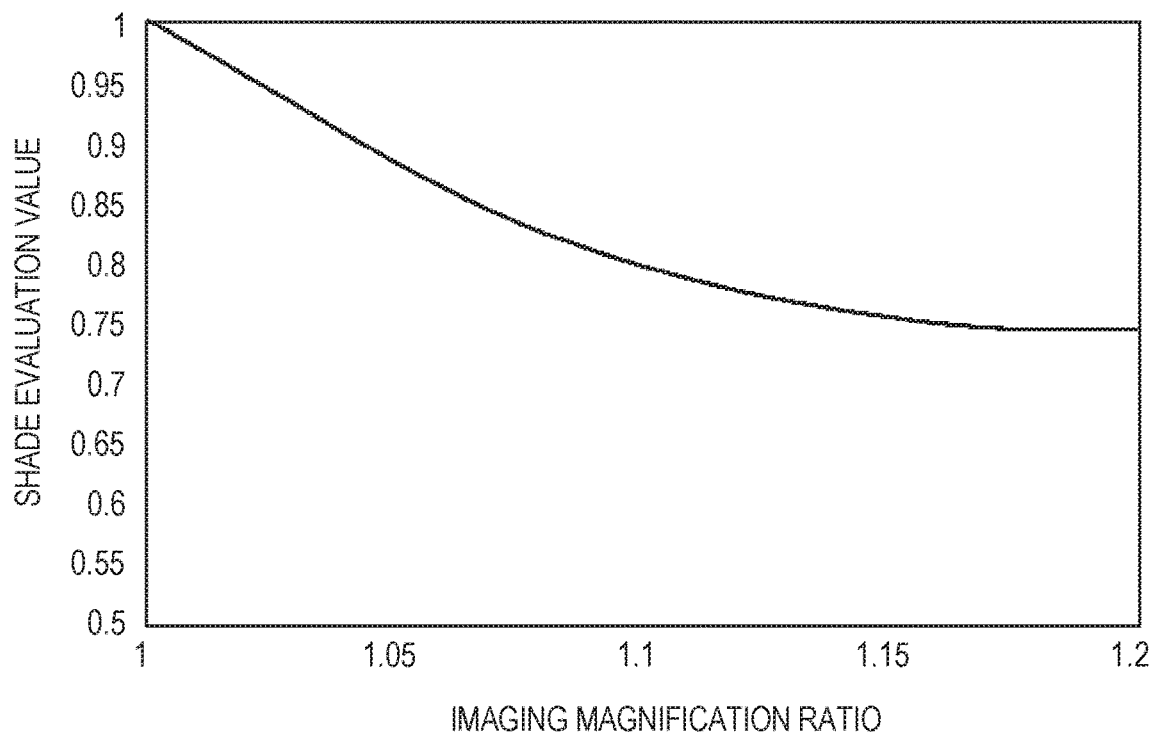
FIG. 4 is a graph for showing a change in shade evaluation value in relation to a change in imaging magnification ratio in the discriminating device.

FIG. 4 is a graph for showing changes in shade evaluation value in relation to changes in imaging magnification ratio in the discriminating device 50.

In FIG. 4, the shade evaluation value is normalized so as to be 1 when the imaging magnification ratio is 1.

A shade evaluation value "Contrast" is defined by Expression (3) with the use of a maximum value max and a minimum value min in the image distributions shown in FIG. 3.

$$\text{Contrast}=(\max-\min)/(\max+\min) \quad (3)$$

As shown in FIG. 4, the shade evaluation value greatly varies in relation to changes in imaging magnification ratio that are caused by displacement of the recording material P in the defocus direction.

This is because the per-pixel reading range in the discriminating device 50 according to the at least one embodiment and the fiber alignment cycle of the recording material P are approximately the same.

Those variations in shade evaluation value cause erroneous discrimination of the type and characteristic value of the recording material P, which brings about difficulty in setting printing conditions optimum for the recording material P.

A case in which the conveyance direction of the recording material P and the fiber alignment direction are substantially perpendicular to each other is considered next.

A shade distribution obtained in this case is what is obtained by rotating the shade distribution illustrated in FIG. 2A by 90°.

This shade distribution appears in the Z direction, not in the Y direction, and a distribution obtained from changes in intensity of received light with time that are observed in each pixel of the light receiving element 54 when the recording material P is conveyed is therefore mainly used to evaluate the surface properties of the recording material P.

A placement error of the recording material P in this case has the same influence as the one in a case in which the conveyance direction of the recording material P and the fiber alignment direction are substantially parallel to each other.

As described in Japanese Patent Application Laid-Open No. 2008-26226, the use of a telecentric optical system is effective in reducing imaging magnification variations that accompany the displacement of the recording material P in the defocus direction described above.

However, when a telecentric optical system and a non-telecentric optical system are designed to be the same in overall optical path length (when a telecentric optical system and a non-telecentric optical system have the same total length for optical paths of principal rays at the central object height), the telecentric optical system is generally narrower in the reading range than the non-telecentric optical system. When a telecentric optical system and a non-telecentric optical system are designed to be the same in the reading range, on the other hand, the overall optical path length of the telecentric optical system is longer than that of the non-telecentric optical system.

With a narrow reading range, particularly when fiber alignment of the recording material P has a long cycle, only a small number of cycles are contained in the reading range and accordingly causes the shade evaluation value to greatly fluctuate, which results in a drop in accuracy of discrimination.

It is therefore an object to obtain a discriminating device that achieves both downsizing and improvement in accuracy of discrimination made by expanding the reading range.

In order to achieve this object, the discriminating device 50 according to the at least one embodiment is designed so as to be close to a telecentric optical system only in the Z direction (that is, the discriminating device 50 is designed so as to use a non-telecentric optical system in the Y direction).

Figure 5A:
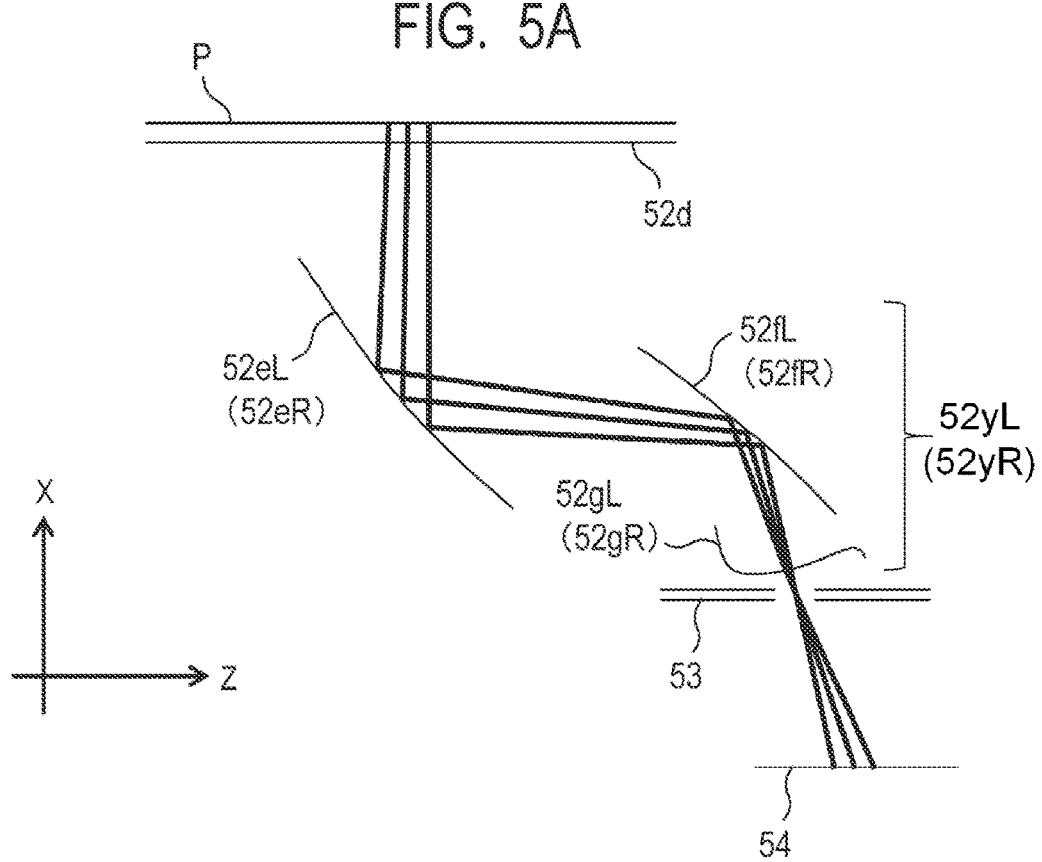
FIG. 5A is a diagram for illustrating some optical paths in the discriminating device according to the at least one embodiment.
Figure 5B:
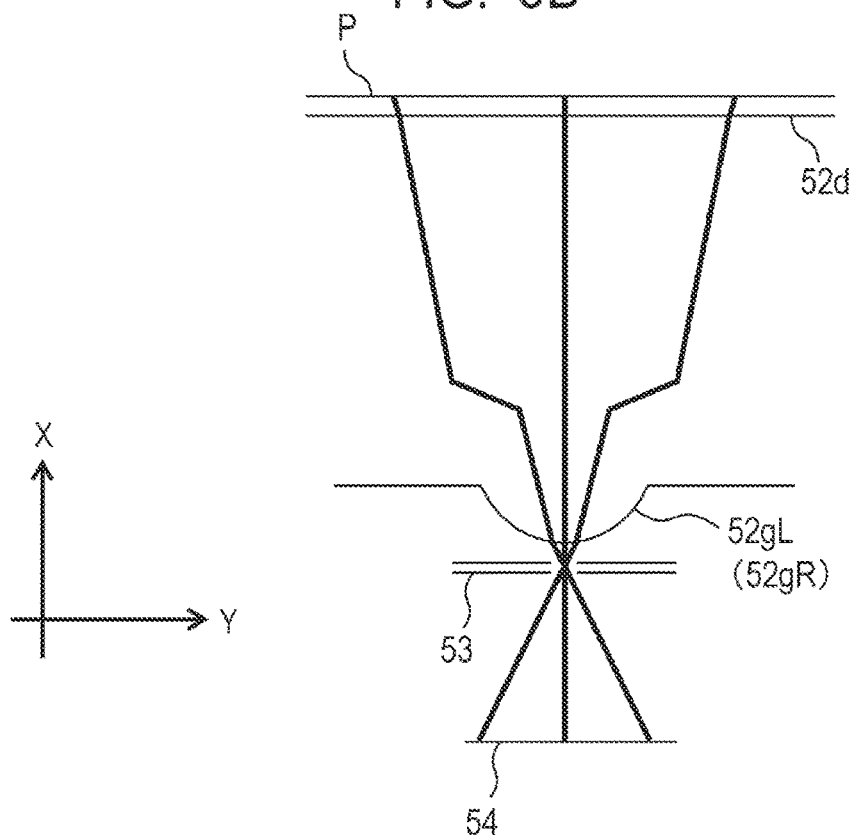
FIG. 5B is a diagram for illustrating some optical paths in the discriminating device according to the at least one embodiment.

FIG. 5A and FIG. 5B are diagrams for illustrating optical paths of principal rays from a detected surface to an image plane in the X-Z section and the X-Y section, respectively, in the discriminating device 50 according to the embodiment.

As illustrated in FIG. 5A, in the X-Z section (a cross section perpendicular to the Y direction) corresponding to FIG. 1C, a plurality of principal rays incident on the image plane (light receiving element 54) at field angles different from one another are substantially parallel to one another in the vicinity of the recording material P.

That is, an imaging optical system in the discriminating device 50 according to the at least one embodiment is close to a telecentric optical system in the Z direction, which helps to keep displacement of the recording material P in the defocus direction from causing imaging magnification variations.

In the X-Y section (a cross section perpendicular to the Z direction) corresponding to FIG. 1E, on the other hand, a plurality of principal rays incident on the image plane (light receiving element 54) at field angles different from one another are not substantially parallel to one another in the vicinity of the recording material P as illustrated in FIG. 5B.

That is, the imaging optical system in the discriminating device 50 according to the at least one embodiment is non-telecentric in the Y-direction, which enables the discriminating device 50 to have a reading range on the recording material P that is larger than in a telecentric optical system.

The discriminating device 50 according to the at least one embodiment is provided with two imaging optical systems (the left-side optical unit 52yL and the right-side optical unit 52yR), and the discussion given above applies to both of the imaging optical systems.

The employment of the configuration described above enables the discriminating device 50 according to the at least one embodiment to accomplish downsizing and the securing of a sufficiently large reading range, and at the same time be successful at suppressing deterioration of discrimination performance due to magnification variations that accompany displacement of the recording material P.

The above-mentioned terms "telecentric optical system" and "non-telecentric optical system" are used for the convenience of description.

More accurately, a feature of the discriminating apparatus 50 according to the at least one embodiment is that, in the defocusing of the recording material P (an object), a magnification variation in the Y direction is designed to be greater than a magnification variation in the Z direction as described below.

Specifically, a feature of the discriminating device 50 according to the at least one embodiment is that the following Conditional Expressions (4) and (5) are satisfied.

$$\left| \frac{\beta m1}{\beta m0} - 1 \right| \geq 0.01 \tag{4}$$

$$\frac{\left| \frac{\beta m1}{\beta m0} - 1 \right|}{\left| \frac{\beta s1}{\beta s0} - 1 \right|} > 1 \tag{5}$$

In the expressions, $\beta m0$ and $\beta s0$ represent an imaging magnification in the Y direction and an imaging magnification in the Z direction, respectively, in a case in which the recording material P is at the nominal position (a first position, a target position in design) that is a position conjugate with the light receiving surface of the light receiving element 54, and $\beta m1$ and $\beta s1$ represent an imaging magnification in the Y direction and an imaging magnification in the Z direction, respectively, in a case in which the recording material P is at a non-nominal position (a second position) shifted from the nominal position by +0.2 mm in the defocus direction (X direction).

The discriminating device 50 according to the at least one embodiment can accomplish downsizing and the securing of a sufficiently large reading range and at the same time suppress the deterioration of discrimination performance due to magnification variations that accompany displacement of the recording material P by satisfying the above-described Conditional Expressions (4) and (5).

In the discriminating device 50 according to the at least one embodiment, the values of $\beta m0$, $\beta m1$, $\beta s0$, and $\beta s1$ are calculated from Table 1 to be −0.499, −0.481, −0.949, and −0.953, respectively.

A magnification variation in the Y direction and a magnification variation in the Z direction that occur in the discriminating device 50 according to the at least one embodiment when the recording material P is at the non-nominal position shifted from the nominal position by +0.2 mm in the X direction are accordingly represented by the following expressions.

$$\left|\frac{\beta m1}{\beta m0} - 1\right| = 0.036$$

$$\left|\frac{\beta s1}{\beta s0} - 1\right| = 0.004$$

The ratio of the magnification variation in the Y direction and the magnification variation in the Z direction is represented by the following expression.

$$\frac{\left|\frac{\beta m1}{\beta m0} - 1\right|}{\left|\frac{\beta s1}{\beta s0} - 1\right|} = 9$$

The discriminating device 50 according to the at least one embodiment is thus proven to satisfy Conditional Expressions (4) and (5), and is therefore capable of downsizing and the securing of a sufficiently large reading range, as well as the suppression of discrimination performance deterioration due to magnification variations that accompany displacement of the recording material P.

In the discriminating device 50 according to the at least one embodiment, the advantageous effects described above are heightened when the magnification variation in the Y direction that accompanies displacement of the recording material P in the defocus direction, that is, the left-hand side of Conditional Expression (4), is 0.03 or more.

The advantageous effects in the discriminating device 50 according to the at least one embodiment are heightened also when the ratio of the magnification variation in the Y direction that accompanies displacement of the recording material P in the defocus direction to the magnification variation in the Z direction, that is, the left-hand side of Conditional Expression (5) is 2 or more. The advantageous effects described above are heightened even more when the ratio of the magnification variation in the Y direction that accompanies displacement of the recording material P in the defocus direction to the magnification variation in the Z direction, that is, the left-hand side of Conditional Expression (5) is 5 or more.

In the discriminating device 50 according to the at least one embodiment, magnification variations caused by displacement of the recording material P in defocusing are desired to be as small as possible as described above. It is therefore preferred to satisfy a condition represented by the following expression.

$$\left|\frac{\beta s1}{\beta s0} - 1\right| \leq 0.01$$

It is also preferred in the discriminating device 50 according to the at least one embodiment to satisfy a condition represented by the following expression.

$$|\beta s0| \geq |\beta m0|$$

The satisfaction of the conditions brings about an effect of facilitating the expansion of the reading range in the Y direction compared to the expansion in the Z direction. On the other hand, an effect of reducing sensitivity to a component placement error in the form of optical performance deterioration can be obtained by avoiding unrequired shrinking of an image in the Z direction, where the expansion of the reading range is less required.

As described above, the recording material P is conveyed in the Z direction in the discriminating device 50 according to the at least one embodiment. A larger image can therefore be obtained when the reading range is expanded in the Y direction, with the result that discrimination performance is improved.

The expansion of the reading range in the Z direction, on the other hand, does not change the size of an obtained image, and an improvement of image resolution in the Z direction improves discrimination performance to a degree smaller than the degree of improvement made by the expansion in the Y direction.

The light receiving element 54 used in the discriminating device 50 according to the at least one embodiment is therefore preferred to be a sensor that has more pixels in the Y direction than those in the Z direction.

In the discriminating device 50 according to the at least one embodiment, a line sensor is used as the light receiving element 54. This provides an effect in that the cost of configuring the light receiving element 54 is lower than when a two-dimensional area sensor is used. However, the light receiving element 54 is not limited to a line sensor, and the effects of the embodiment can be obtained also when a two-dimensional area sensor is used.

The left-side optical unit 52yL and right-side optical unit 52yR of the discriminating device 50 according to the at least one embodiment have an overall optical path length (the total length of optical paths of principal rays at the central object height) that measures 9.8 mm.

In a small-sized imaging optical system in which the overall optical path length is 20 mm or less as in the discriminating device 50 according to the at least one embodiment, a magnification variation that accompanies displacement of an object by 0.2 mm in the defocus direction accordingly tends to be large. The small-sized imaging optical system is also prominent in the effects provided by the configuration of the embodiment in order to secure a sufficiently large reading range as described above.

In the left-side optical unit 52yL and right-side optical unit 52yR of the discriminating device 50 according to the at least one embodiment, principal rays at the central object height pass through surface vertices (defined origins of aspherical surfaces) of the planes, and the overall optical path length can therefore be calculated from an interval between the surface vertices.

The optical units 52yL and 52yR of the discriminating device 50 according to the at least one embodiment have the first imaging reflecting curved surfaces 52eL and 52eR, the second imaging reflecting curved surfaces 52fL and 52fR, and the imaging transmitting curved surfaces 52gL and 52gR, respectively, which are anamorphic optical surfaces.

In the discriminating device 50 according to the at least one embodiment, imaging performance in the Y direction and imaging performance in the Z direction can be configured independently of each other by designing the left-side optical unit 52yL and the right-side optical unit 52yR in this manner.

An effect of improving the degree of freedom of design can therefore be obtained in a design that varies sensitivity of magnification variation depending on the direction as in the discriminating device 50 according to the at least one embodiment.

In the discriminating device 50 according to the at least one embodiment, curved surfaces that refract or reflect a light beam in an imaging optical system are all formed in a single light guiding member 52.

The discriminating device 50 according to the at least one embodiment can therefore have an effect of keeping the cost low compared to a configuration of the related art that uses a plurality of optical elements.

In the optical units 52yL and 52yR of the discriminating device 50 according to the at least one embodiment, the imaging transmitting curved surfaces 52gL and 52gR have a curvature with respect to the Y direction, and the first imaging reflecting curved surfaces 52eL and 52eR and the second imaging reflecting curved surfaces 52fL and 52fR have a curvature with respect to the Y direction.

The discriminating device 50 according to the at least one embodiment can have an effect of facilitating the reduction of the curving of an image plane and consequently the expansion of the reading range by designing an imaging optical system so that a reflection surface and a refraction surface are combined in this manner.

As described above, in the discriminating device 50 according to the at least one embodiment, the single light guiding member 52 has the first imaging reflecting curved surfaces 52eL and 52eR, the second imaging reflecting curved surfaces 52fL and 52fR, and the imaging transmitting curved surfaces 52gL and 52gR in the optical units 52yL and 52yR, which refract or reflect a light beam.

The illumination incident flat surface 52a, the illumination reflecting flat surface 52b, the left-side illumination reflecting curved surfaces 52cL and 52cR, and the illumination exit flat surface 52d, which are part of an illumination optical system for illuminating the recording material P, are also formed in the single light guiding member 52.

An effect of keeping the cost low compared to a configuration of the related art that uses a plurality of optical elements can be obtained by thus integrating (unitarily configuring) the illumination optical system and the imaging optical system.

In addition, with an illumination optical system and an imaging optical system provided in a single light guiding member in this manner, the advantageous effects of the at least one embodiment are easily obtained when the overall optical path length of the imaging optical system is determined by constraints of the illumination optical system and downsizing is consequently required.

As described above, a placement error of the recording material P in the defocus direction may be caused by, for example, the wearing of the imaging incident flat surface 52d accompanying overlong conveyance of the recording material P.

In such cases, an image of a correction sheet on which monochromatic lines each having a predetermined width are printed is read in the discriminating device 50 according to the at least one embodiment. A controller (correcting unit) (not shown) analyzes an image distribution obtained through the reading, to thereby calculate the value of an imaging magnification variation from a detection result. The calculated value is used as a correction value in image processing.

This correction can have high accuracy with respect to the Y direction because pixels of the line sensor, which is the light receiving element 54 in the discriminating device 50 according to the at least one embodiment, are accurately arranged in the Y direction and the reliability of the cycle of the obtained image distribution is accordingly high.

With respect to the Z direction, on the other hand, the discriminating device 50 according to the at least one embodiment uses, as described above, a distribution obtained from changes in intensity with time that occur in each pixel of the light receiving element 54 when the recording material P is conveyed. Highly accurate correction is therefore not possible unless the conveyance speed of the recording material P is recognized with high precision.

An additional cost is required to provide the discriminating device 50 according to the at least one embodiment with a mechanism for precisely recognizing the conveyance speed of the recording material P. It is therefore preferred from this viewpoint as well to design a configuration in which magnification variations are suppressed with respect to the Z direction.

[Image Forming Apparatus]

Figure 6:
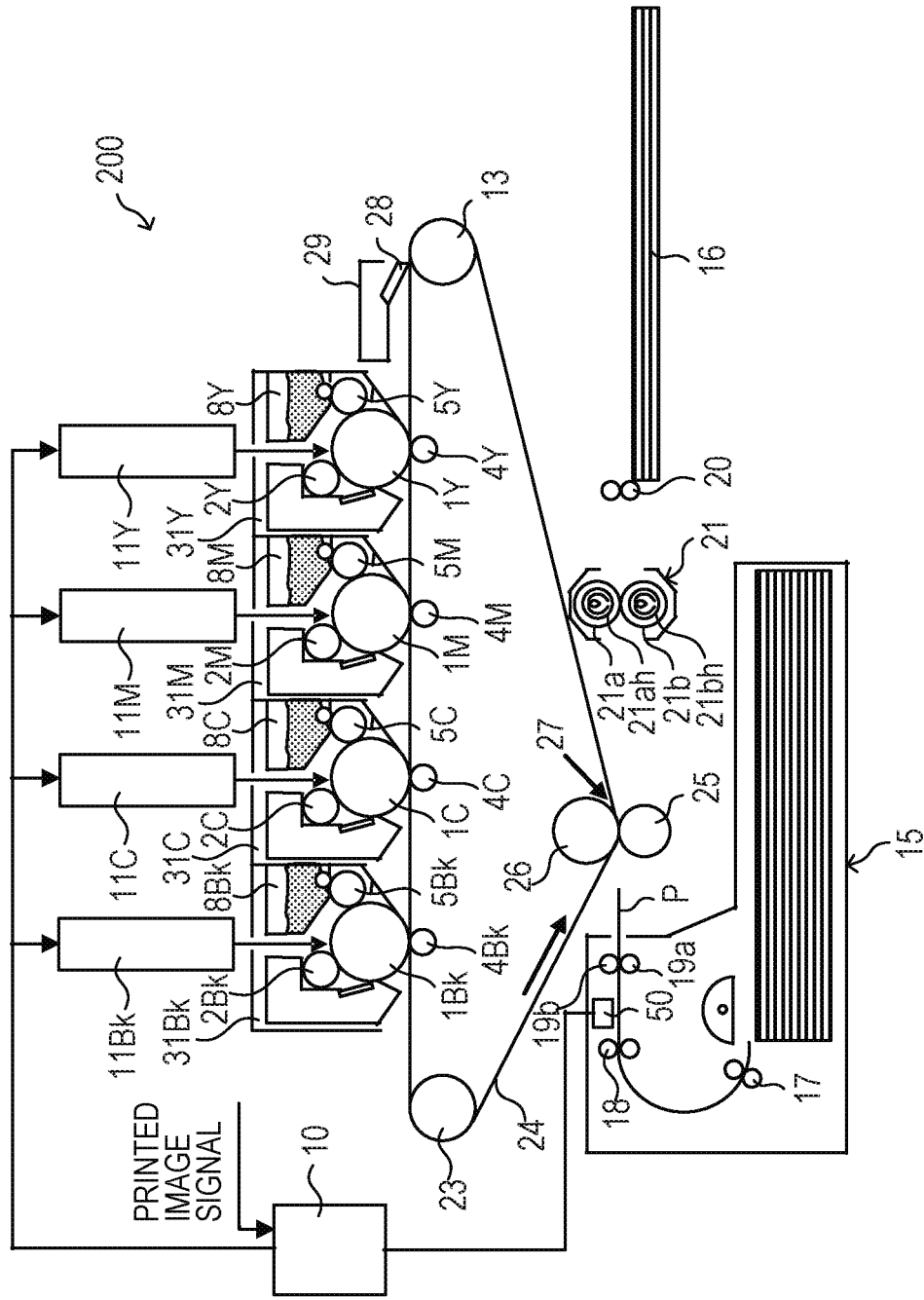
FIG. 6 is a sub-scanning sectional view of main units of an image forming apparatus having the discriminating device according to the at least one embodiment mounted thereon.

FIG. 6 is a sub-scanning sectional view of main units of an image forming apparatus 200 having a discriminating device 50 according to the at least one embodiment mounted thereon.

The image forming apparatus 200 is a tandem type color image forming apparatus employing an intermediate transfer belt.

The image forming apparatus 200 includes photosensitive bodies (photosensitive drums) 1Y, 1M, 1C, and 1Bk for stations of respective colors of yellow (Y), magenta (M), cyan (C), and black (Bk), and charging rollers 2Y, 2M, 2C, and 2Bk. Further, the image forming apparatus 200 includes primary transfer rollers 4Y, 4M, 4C, and 4Bk, and developing units 8Y, 8M, 8C, and 8Bk. Further, the image forming apparatus 200 includes a controller 10, light scanning apparatuses 11Y, 11M, 11C, and 11Bk, a tension roller 13, a feeding unit 15, a discharge tray 16, discharging rollers 20, a fixing unit 21, and a driving roller 23. Further, the image forming apparatus 200 includes an intermediate transfer belt 24, a secondary transfer roller 25, a secondary transfer counter roller 26, a cleaner 28, a cleaner container 29, toner cartridges 31Y, 31M, 31C, and 31Bk, and the discriminating device 50.

The photosensitive drums 1Y, 1M, 1C, and 1Bk each have an organic light conducting layer applied to an outer periphery of an aluminum cylinder. The photosensitive drums 1Y, 1M, 1C, and 1Bk each rotate in a clockwise direction in FIG. 6 in accordance with an image forming operation when receiving a driving force of a driving motor (not shown).

The intermediate transfer belt 24 is held in abutment against the photosensitive drums 1Y, 1M, 1C, and 1Bk, and rotates in a counterclockwise direction in synchronization with the rotation of the photosensitive drums 1Y, 1M, 1C, and 1Bk at a time of color image formation.

The fixing unit 21 is configured to melt and fix a transferred multi-color toner image while conveying the recording material P. As illustrated in FIG. 6, the fixing unit 21 includes a fixing roller 21a configured to heat the recording material P and a pressurizing roller 21b configured to bring the recording material P into pressure contact with the fixing roller 21a. The fixing roller 21a and the pressurizing roller 21b are each formed in a hollow shape, and include heaters 21ah and 21bh inside, respectively.

When the controller 10 receives an image signal from an external device (not shown), the recording material (transferred material) P is fed from the feeding unit 15 to the image forming apparatus 200 by feeding rollers 17 and 18. After that, the recording material P is temporarily sandwiched by a roller-shaped synchronous rotary member for synchronizing the image forming operation described later with the conveyance of the recording material P, that is, a conveyance roller pair 19a and 19b formed of a conveyance (registration) roller 19a and a conveyance (registration) counter roller 19b, and is stopped to be brought into a standby state.

Further, in accordance with the received image signal, the controller 10 causes the light scanning apparatuses (exposure apparatuses) 11Y, 11M, 11C, and 11Bk to form electrostatic latent images on surfaces (photosensitive surfaces) of the photosensitive drums 1Y, 1M, 1C, and 1Bk each charged to a certain potential through action of the charging rollers 2Y, 2M, 2C, and 2Bk, respectively.

Then, the developing units 8Y, 8M, 8C, and 8Bk visualize, that is, develop the electrostatic latent images formed on the surfaces of the photosensitive drums 1Y, 1M, 1C, and 1Bk, respectively.

The developing units 8Y, 8M, 8C, and 8Bk include sleeves 5Y, 5M, 5C, and 5Bk, respectively, and are each supplied with a developing bias for visualizing the electrostatic latent image.

Thus, the electrostatic latent images formed on the surfaces of the photosensitive drums 1Y, 1M, 1C, and 1Bk are each developed as a monochromatic toner image through action of the developing units 8Y, 8M, 8C, and 8Bk, respectively.

The photosensitive drums 1Y, 1M, 1C, and 1Bk, the charging rollers 2Y, 2M, 2C, and 2Bk, and the developing units 8Y, 8M, 8C, and 8Bk have integrated configurations, respectively, and are mounted on the image forming apparatus 200 as toner cartridges 31Y, 31M, 31C, and 31Bk capable of being detached from a main body of the image forming apparatus 200.

Next, the developed monochromatic toner images are successively transferred onto the intermediate transfer belt (transferring unit) 24 through action of the respective primary transfer biases applied to the primary transfer rollers (transferring units) 4Y, 4M, 4C, and 4B, with the result that a multi-color toner image is formed on the intermediate transfer belt 24.

Then, the multi-color toner image formed on the intermediate transfer belt 24 is conveyed to a secondary transfer nip portion (transferring unit) 27 formed of the secondary transfer roller 25 and the secondary transfer counter roller 26.

Simultaneously with this, the recording material P that has been brought into a standby state under a state of being sandwiched by the conveyance roller pair 19a and 19b is conveyed to the secondary transfer nip portion 27 in synchronization with the multi-color toner image on the intermediate transfer belt 24 through action of the conveyance roller pair 19a and 19b.

Thus, the multi-color toner image on the intermediate transfer belt 24 is transferred at once onto the recording material P at the secondary transfer nip portion 27 through action of a secondary transfer bias applied to the secondary transfer roller 25.

Then, the recording material P holding the multi-color toner image is conveyed by the fixing roller 21a and the pressurizing roller 21b, which form the fixing unit 21, and is supplied with heat and a pressure, with the result that the multi-color toner image is fixed to the surface of the recording material P.

The recording material P having the toner image fixed thereto is discharged to the discharge tray 16 by the discharging rollers 20, and the image forming operation is completed.

Then, the cleaner 28 cleans a transfer residual toner remaining on the intermediate transfer belt 24, and the collected transfer residual toner is stored in the cleaner container 29 as a waste toner.

The above-mentioned series of the image forming operations is controlled by the controller 10 arranged in the image forming apparatus 200.

In the image forming apparatus 200, the discriminating device according to the at least one embodiment is provided as the discriminating device 50 configured to discriminate the type of the recording material P.

The discriminating device 50 is arranged on an upstream side of the conveyance roller pair 19a and 19b in a recording material conveyance direction, and is capable of detecting information reflecting the surface smoothness of the recording material P conveyed from the feeding unit 15.

The discriminating device 50 performs discrimination while the recording material P is fed from the feeding unit 15 to the image forming apparatus 200 and is stopped under a state of being sandwiched by the conveyance roller pair 19a and 19b.

Then, the controller 10 performs an operation of controlling the image forming apparatus 200 by setting optimum image forming conditions, for example, a transfer bias and a fixing temperature, based on discrimination information (discrimination results) on the type of the recording material P sent from the discriminating device 50.

According to at least one embodiment of the present invention, the discriminating device capable of achieving both securing of a detection region and retaining of detection accuracy is provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-105355, filed Jun. 5, 2019, which is hereby incorporated by reference herein in its entirety.

What is claimed is:

1. A discriminating device comprising:
a light receiving unit configured to receive a light beam from a detected surface; and
an optical unit configured to guide the light beam from the detected surface to the light receiving unit,
wherein the following conditional expressions are satisfied:

$$0.01 \leq |\beta m1/\beta m0 - 1|, \text{ and}$$

$$1 < |\beta m1/\beta m0 - 1|/|\beta s1/\beta s0 - 1|, \text{ where}$$

$\beta m0$ represents a magnification of the optical unit with respect to a first direction in a first cross section parallel to the detected surface when the detected surface is at a first position, $\beta m1$ represents a magnification of the optical unit with respect to the first direction in the first cross section when the detected surface is at a second position, the second position being shifted from the first position by +0.2 mm in a direction perpendicular to the detected surface, $\beta s0$ represents a magnification of the optical unit with respect to a second direction perpendicular to the first direction in the first cross section when the detected surface is at the first position, and βs1 represents a magnification of the optical unit with respect to the second direction in the first cross section when the detected surface is at the second position.

2. The discriminating device according to claim 1, wherein the following conditional expression is satisfied:

$|\beta s1/\beta s0-1|\leq 0.01.$

3. The discriminating device according to claim 1, wherein the following conditional expression is satisfied:

$|\beta m0|<|\beta s0|.$

4. The discriminating device according to claim 1, wherein the light receiving unit includes a sensor that has more pixels in the first direction than in the second direction.

5. The discriminating device according to claim 1, wherein the light receiving unit includes a line sensor.

6. The discriminating device according to claim 1, wherein the optical unit has an overall optical path length that is 20 mm or less.

7. The discriminating device according to claim 1, wherein the optical unit has an anamorphic optical surface.

8. The discriminating device according to claim 1, wherein the optical unit includes an optical element, and a light beam is refracted or reflected by only the optical element in the optical unit.

9. The discriminating device according to claim 1, further comprising an illumination unit configured to illuminate the detected surface, wherein the illumination unit is at least partially configured so as to be integral with the optical unit.

10. The discriminating device according to claim 1, wherein the optical unit has a transmitting surface having a curvature with respect to the first direction, and a reflection surface having a curvature with respect to the first direction.

11. The discriminating device according to claim 1, further comprising a discriminating unit configured to discriminate an object on the detected surface, based on output from the light receiving unit.

12. The discriminating device according to claim 11, wherein the object is conveyed in the second direction.

13. The discriminating device according to claim 1, further comprising a correcting unit configured to correct a variation of the magnification.

14. An image forming apparatus comprising:
the discriminating device according to claim 1;
an exposure apparatus configured to form an electrostatic latent image on a photosensitive surface;
a developing unit configured to develop the electrostatic latent image as a toner image;
a transferring unit configured to transfer the developed toner image onto a transferred material; and
a fixing unit configured to fix the transferred toner image to the transferred material.

15. The image forming apparatus according to claim 14, further comprising a controller configured to set an image forming condition in accordance with a discrimination result obtained by the discriminating device.

* * * * *